United States Patent [19]

Takahashi et al.

[11] Patent Number: 4,853,297
[45] Date of Patent: Aug. 1, 1989

[54] MULTILAYER COATED CORROSION RESISTANT METAL PIPE

[75] Inventors: Teruhisa Takahashi, Mishima; Masashi Kajiyama, Tagata, both of Japan

[73] Assignee: Usui Kokusai Sangyo Kaisha Ltd., Sunto, Japan

[21] Appl. No.: 202,098

[22] Filed: Jun. 2, 1988

[51] Int. Cl.$^4$ ............................................... F16L 9/14
[52] U.S. Cl. ..................................... 428/623; 138/143; 138/146; 138/151; 138/171; 428/626; 428/632; 428/650; 428/658; 428/659; 428/674; 428/926; 428/935
[58] Field of Search ............... 428/623, 626, 632, 650, 428/658, 659, 674, 926, 935; 138/142, 143, 145, 146, 151, 171

[56] References Cited

U.S. PATENT DOCUMENTS

| | | | |
|---|---|---|---|
| 3,671,205 | 6/1972 | Uchida et al. | 428/623 |
| 4,003,760 | 1/1977 | Labenski et al. | 204/38.4 |
| 4,659,394 | 4/1987 | Hara et al. | 428/623 |
| 4,775,600 | 10/1988 | Adaniya et al. | 428/623 |

Primary Examiner—Robert McDowell
Attorney, Agent, or Firm—Anthony J. Casella; Gerald E. Hespos

[57] ABSTRACT

A corrosion resistant metal pipe having an outer surface coated with a zinc film, a chromate film, an intermediate layer consisting substantially of an epoxy resin, and a polyvinyl fluoride film formed one upon another in the order listed.

8 Claims, 1 Drawing Sheet

PRIOR ART

MULTILAYER COATED CORROSION RESISTANT METAL PIPE

BACKGROUND OF THE INVENTION

1. Field of the Invention

This invention relates to a multilayer coated corrosion resistant metal pipe, or a metal pipe having an outer surface coated with a plurality of layers of corrosion resistant materials. It is particularly concerned with a metal pipe having a relatively small inside diameter not exceeding 20 mm.

2. Description of the Prior Art

Metal pipes often have their outer surfaces covered with protective coating. These pipes are used for making, for example, pipelines for conveying a brake fluid and fuel in a motor vehicle. These pipelines are located under the body of the vehicle. As they are used in such a bad environment, the pipes are required to have high degrees of corrosion resistance, scratch resistance, impact strength and mechanical wear resistance. Spiked tires have come to be often used in the cold season during which ice is likely to form on the road surface. These tires, however, damage the road surface and raise dust when it is not covered with ice. Rock salt is sprinkled onto the road surface to prevent its freezing. A yearly increase in the use of rock salt, however, is making the problem of pipe corrosion more serious. The pipes are also liable to damage or wear by stones or mud spattered by the rotating wheels of the vehicle. It is, therefore, necessary that the pipes be so coated as to resist both chemical corrosion and mechanical damage or wear.

Reference is made to FIG. 3 showing by way of example a known pipe of the type to which this invention pertains. It comprises a double-rolled steel pipe 11 made by rolling a steel strip or hoop twice and brazing its longitudinal edges by means of a copper plating layer 12, or a seam welded steel pipe. The pipe 11 has an outer surface coated with an electroplated zinc film 13. The film 13 has an outer surface coated with a relatively thick special chromate film 14 having an olive color. The chromate film 14 has an outer surface coated with a fluorinated resin film 16. Pipes of this kind are disclosed in, for example, Japanese Patent Publications Nos. 60434/1982 and 23271/1986.

The fluorinated resin film is formed by impregnating the chromate film with a dispersion of polyvinyl fluoride immediately after the formation of the chromate film when it is still in the state of a gel, and drying them under heat, so that the fluorinated resin film may form an intimate bond with the chromate film. When the chromate film is formed by treating the pipe with a solution, it requires large amounts of a chromium compound and an organic acid, such as formic acid, used as a reducing agent. It is necessary to supply the treating solution with the chromium compound, etc. frequently and yet renew it at regular intervals of time in order to maintain a constant film forming capacity. The waste solution, however, contains a large amount of chromium having a valence of 6, which is a toxic substance, and its disposal, therefore, costs a great deal. Although the chromate film as formed is highly resistant to corrosion, the heat to which it is exposed during the formation of the resin film deprives it of water and thereby makes it brittle. The plastic deformation, such as bending or double flaring, of the pipe forms in the chromate film fine cracks which lower its rustproofing property.

SUMMARY OF THE INVENTION

Under these circumstances, it is an object of this invention to provide a multilayer coated corrosion resistant metal pipe which can overcome the drawbacks of the prior art as hereinabove pointed out and is highly resistant to chemical corrosion, mechanical damage and gear.

This object is attained by a coated pipe which comprises a metal pipe having an outer surface coated with a zinc film, a chromate film, an intermediate layer consisting substantially of an epoxy resin, and a polyvinyl fluoride film formed one upon another in the order mentioned.

The coated pipe of this invention is particularly characterized in that the intermediate layer consisting of an epoxy resin is present between the chromate film and the polyvinyl fluoride film.

Other features and advantages of this invention will be apparent from the following description and the accompanying drawings.

DETAILED DESCRIPTION OF THE INVENTION

Figure 1:
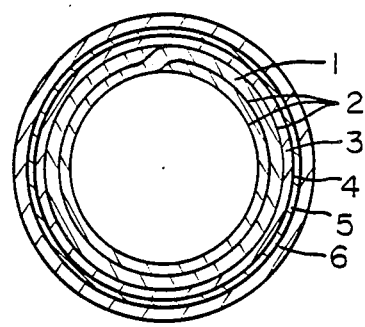
FIG. 1 is a cross sectional view of a coated pipe embodying this invention.

A multilayer coated pipe embodying this invention is shown in FIG. 1. It comprises a metal pipe 1. More specifically, it is a double-rolled steel pipe formed by rolling a steel hoop twice and brazing its longitudinal edges and other mutually contacting surfaces by means of a copper plating layer 2. The pipe has a relatively small inside diameter not exceeding 20 mm. A copper plating layer 2 is also provided on the outer surface of the pipe 1 and has a thickness of, say, three microns.

The metal pipe 1 may alternatively be a seam welded steel pipe, or a seamless steel pipe made by drawing and having an appropriate diameter. Moreover, the pipe 1 does not necessarily need to be of steel but may also be of other material, such as aluminum or copper. A modified form of pipe is shown by way of example in FIG. 2.

The outer surface of the metal pipe 1 is coated with a zinc film 3. The zinc film 3 can be formed by a known electroplating method employing an acidic electrolyte containing sulfuric acid or an alkaline electrolyte containing zinc cyanide. It has a thickness of 5 to 35 microns. A zinc film having a thickness below five microns would fail to provide satisfactory corrosion resistance, while a zinc film having a thickness over 5 microns would peel off the pipe when it is bent.

A chromate film 4 covers the zinc film 3. It is usually a film or chromate having a yellow color and is formed by using an ordinary solution containing chromic acid at a low concentration immediately after the formation of the zinc film 3. The film 4 may alternatively of chromate having an olive color if the pipe is of the type which will not be subjected to plastic deformation.

An intermediate layer 5 consisting substantially of an epoxy resin covers the chromate film 4, the epoxy resin of which being one member selected from bisphenol-A type epoxy resin, bisphenol-F type epoxy resin, bisphenol-AD type epoxy resin, phenol novolac based epoxy resin, cresol novolac based epoxy resin, brominated bisphenol-A type epoxy resin and/or polyglycol epoxy resin and having a viscosity of 10 to 60 seconds (Ford cup #4) at a temperature of 25° ±5° C., being capable of baking at a temperature of 200° to 700° C. for 10 to 25 seconds and having a hardness of formed film of B to 4H (pencil). The intermediate layer 5 is formed by dipping the chromate film 4 in the above-mentioned epoxy resin or spraying the epoxy resin onto the chromate film 4, and is dried under heat. The intermediate layer 5 has a thickness of 1 to 20 microns. A layer having a thickness below one micron would fail to adhere to the chromate film 4, while a layer having a thickness over 20 microns would crack, or be separated from a polyvinyl fluoride film which will hereinafter be described in detail. The intermediate layer 5 having an appropriate thickness forms a strong bond with both the underlying chromate film 4 and the overlying resin film.

The polyvinyl fluoride film 6 covers the intermediate layer 5. It is formed by employing a solution prepared by dispersing polyvinyl fluoride in a high-boiling solvent, such as dimethyl or diethylene phthalate, until no solid fluoride can be found. The intermediate layer is dipped in the solution, or the solution is sprayed onto the intermediate layer, and the solution covering the layer is dried under heat at a temperature up to, say, 350° C. The polyvinyl fluoride film 6 has a thickness of 5 to 50 microns. A polyvinyl fluoride film having a thickness below five microns would fail to provide satisfactory corrosion resistance, while a film having a thickness over 50 microns would not be more effective than any film having a thickness of 50 microns or below, but would only be more costly.

Figure 2:
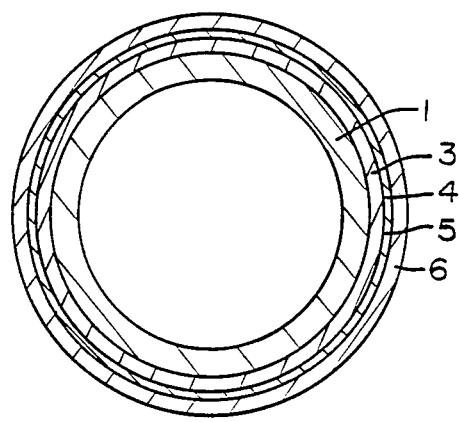
FIG. 2 is a cross sectional view of a coated pipe according to another embodiment of this invention.
Figure 3:
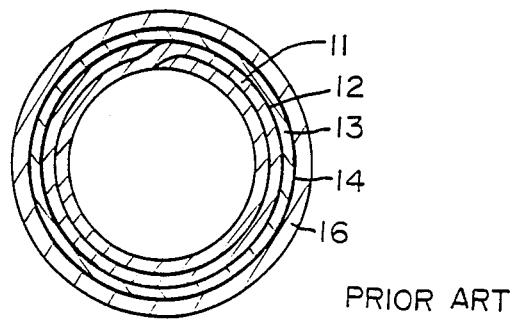
FIG. 3 is a cross sectional view of a known coated pipe.

The films or layers 3 to 6 shown in FIG. 2 are identical to their counterparts in FIG. 1 which have hereinabove been described. No further description of the coated pipe shown in FIG. 2 is, therefore, made.

The intermediate layer bonds the chromate film and the polyvinyl fluoride film so strongly that neither of these films may crack or peel away when the pipe is bent or otherwise deformed. The layer also adds to the corrosion resistance of the pipe. The polyvinyl fluoride film is a very good protective film because of its excellency in mechanical strength, and heat, weather and chemical resistances. The coated pipe of this invention is, therefore, very suitable for use in a highly corrosive and abrasive environment, such as under the bottom of a motor vehicle. This invention is also valuable as it facilitates the control of the solution which is used to form the chromate film.

The invention will now be described more specifically with reference to a number of examples.

EXAMPLE 1

Five coated pipes were prepared in accordance with the following procedure:

(1) Metal pipe:

Each pipe was a double-rolled steel pipe formed from a steel hoop coated with a copper layer having a thickness of three microns, and having an outside diameter of 4.76 mm and a wall thickness of 0.7 mm;

(2) Formation of a zinc film:

An electroplated zinc film having a thickness of 25 microns was formed on the outer surface of the steel pipe by employing an acidic electrolyte consisting mainly of zinc sulfate and containing an organic additive, and applying an electric current at a density of 60 $A/d^2$ at a temperature of 55° C. to 60° C.;

(3) Formation of a chromate film:

A yellow chromate film was formed on the zinc film by employing a chromating solution containing chromium having a valence of 6 at as low a concentration as 1 g per liter;

(4) Formation of an intermediate layer:

The steel pipe was, then, dipped in a paint which had been prepared by dissolving an epoxy resin and a pigment in a solvent, and the paint on the pipe was heated at a temperature of 300° C. for 60 seconds, whereby an intermediate epoxy resin layer having a thickness of five microns was formed on the chromate film; and (5) Formation of a polyvinyl fluoride film:

Then, the pipe was dipped in a solution which had been prepared by dispersing polyvinyl fluoride in diethyl phthalate, and the solution on the pipe was dried by heating at a temperature of 350° C. for 60 seconds, whereby a polyvinyl fluoride film having a thickness of 15 microns was formed on the intermediate layer.

Each coated pipe was tested for corrosion resistance. A test specimen having a length of 300 mm was prepared from each coated pipe. A plurality of cuts spaced apart from one another by a distance of 10 mm were formed by a knife in the coating on each specimen, so that they might reach the steel pipe. A salt solution spray test was conducted on the specimen in accordance with the method as specified by JIS No. Z2371. The salt solution caused a stripe to appear along each cut as a result of the corrosion and discoloration of the chromate or zinc film. Time was counted until the stripes which had appeared along every two adjoining cuts and gradually spread eventually joined each other. The results are shown in a table below.

EXAMPLE 2

Five coated pipes were prepared in accordance with the following procedure:

(1) Metal pipe:

Each pipe was a seam welded steel pipe formed from the same steel hoop as that used in EXAMPLE 1, and having an outside diameter of 6.35 mm and a wall thickness of 0.7 mm;

(2) Formation of a zinc film:

The procedure of EXAMPLE 1 was repeated for forming an electroplated zinc film having a thickness of 25 microns on the outer surface of the steel pipe;

(3) Formation of a chromate film:

A yellow chromate film was formed on the zinc film by employing a chromating solution containing chromium having a valence of 6 at a concentration of 5 g per liter;

(4) Formation of an intermediate layer:

The same paint as that used in EXAMPLE 1 was sprayed onto the chromate film, and was heated at a temperature of 320° C. for 60 seconds, whereby an intermediate epoxy resin layer having a thickness of five microns was formed on the chromate film; and (5) Formation of a polyvinyl fluoride film:

The same dispersion of polyvinyl fluoride as that used in EXAMPLE 1 was sprayed onto the intermediate layer, and was dried by heating at a temperature of 380° C. for 60 seconds, whereby a polyvinyl fluoride film having a thickness of 15 microns was formed on the intermediate layer and a coated pipe having a cross section as shown in FIG. 2 was obtained.

The procedure of EXAMPLE 1 was repeated for conducting a corrosion resistance test on each coated pipe. The results are shown in the table below.

COMPARATIVE EXAMPLE

Five coated pipes were prepared in accordance with the following procedure:

(1) Metal pipe:

Each pipe was a double-rolled steel pipe duplicating each pipe that had been used in EXAMPLE 1;

(2) Zinc film:

The procedure of EXAMPLE 1 was repeated for forming an electroplated zinc film having a thickness of 25 microns on the outer surface of the steel pipe;

(3) Chromate film:

The steep pipe was dipped for 20 seconds in a chromating solution containing chromium having a valence of 6 at a concentration of 13 g per liter and further containing formic acid and acetic acid, whereby a chromate film having an olive color was formed on the zinc film; and (4) Polyvinyl fluoride film:

The pipe which had been coated so far was washed with water and air was jetted against it to remove water from it. Then, the procedure of EXAMPLE 1 was repeated for forming a polyvinyl fluoride film on the chromate film.

The procedure of EXAMPLE 1 was repeated for conducting a corrosion resistance test on each coated pipe. The results are shown in the table below.

TABLE

| Specimen No. | Time elapsed before merger of stripes along two adjoining knife cuts (hours) | | |
|---|---|---|---|
| | EXAMPLE 1 | EXAMPLE 2 | COMPARATIVE EXAMPLE |
| 1 | 1104 | 1080 | 504 |
| 2 | 1032 | 1104 | 600 |
| 3 | 1176 | 1224 | 576 |
| 4 | 1008 | 1080 | 480 |
| 5 | 1104 | 1008 | 504 |

As is obvious from the table, the coated pipes embodying this invention were by far superior to the known coated pipe in corrosion resistance.

What is claimed is:

1. A corrosion resistant pipe comprising a metal pipe having an outer surface coated with a zinc film, a chromate film, an intermediate layer consisting essentially of an epoxy resin, and a polyvinyl fluoride film formed one upon another in the order listed.

2. A corrosion resistant pipe as set forth in claim 1, wherein said metal pipe is a steel pipe selected from the group consisting of a double-rolled steel pipe, a seam welded steel pipe and a seamless steel pipe.

3. A corrosion resistant pipe as set forth in claim 2, wherein said zinc film is an electroplated film formed by employing an electrolyte selected from among an acidic electrolyte containing sulfuric acid and an alkaline electrolyte containing zinc cyanide.

4. A corrosion resistant pipe as set forth in claim 1, wherein said metal pipe is of a material selected from the group consisting of aluminum and copper.

5. A corrosion resistant pipe as set forth in claim 3, wherein said zinc film is an electroplated film formed by employing an electrolyte selected from among an acidic electrolyte containing sulfuric acid and an alkaline electrolyte containing zinc cyanide.

6. A corrosion resistant pipe as set forth in any of claim 1, wherein said zinc film is an electroplated film formed by employing an electrolyte selected from among an acidic electrolyte containing sulfuric acid and an alkaline electrolyte containing zinc cyanide.

7. A corrosion resistant pipe as set forth in claim 1, wherein the epoxy resin is at least one member selected from a group consisting of bisphenol-A type, bisphenol-F type, bisphenol-AD type, phenol novolac based, cresol novolac based, brominated bisphenol-A type and polyglcol epoxy resins.

8. A corrosion resistant pipe as set forth in claim 1 wherein said zinc film has a thickness of 5 to 35 microns, said intermediate layer has a thickness of 1 to 20 microns, and said polyvinyl fluoride film has a thickness of 5 to 50 microns.

* * * * *